March 25, 1969
L. E. HELDENBRAND
3,434,732
VERTICALLY ADJUSTABLE CATTLE CHUTE
Filed Aug. 16, 1967
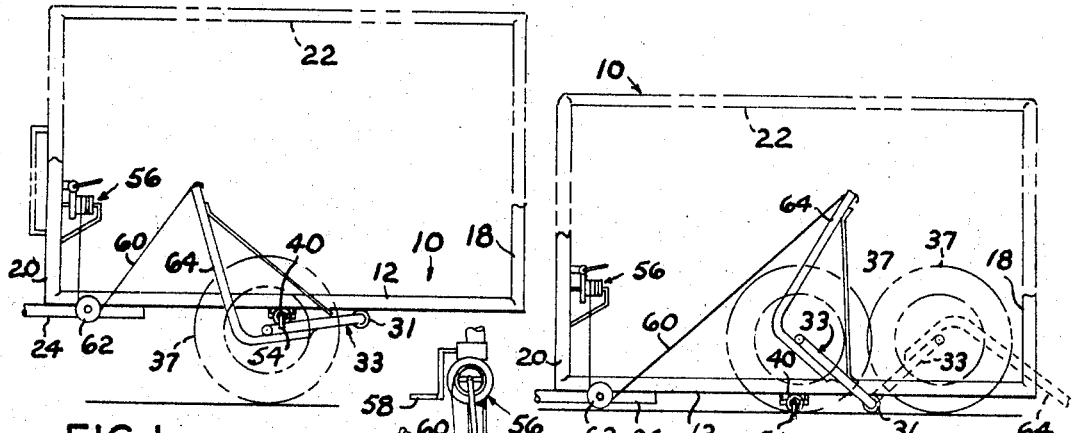
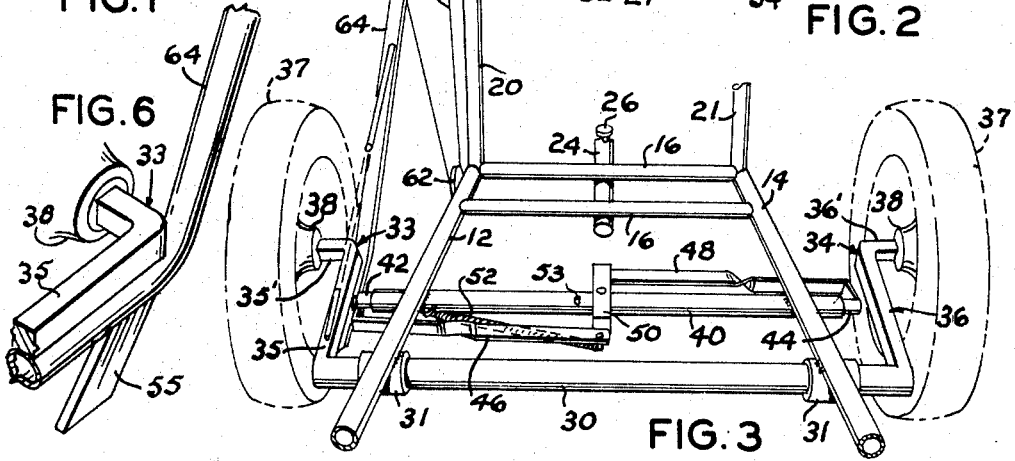
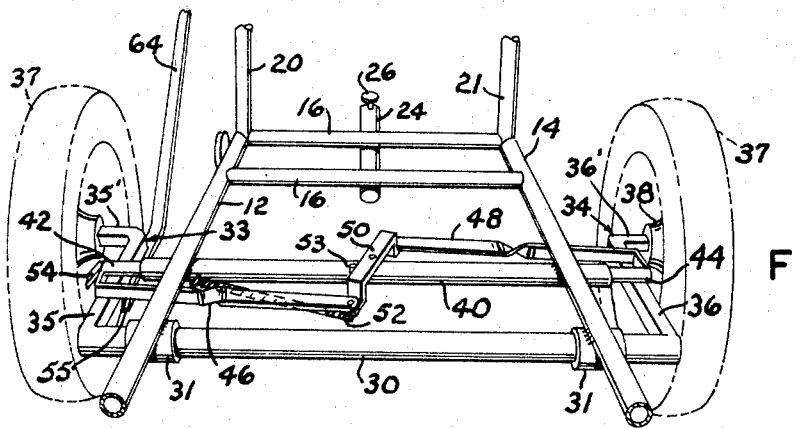
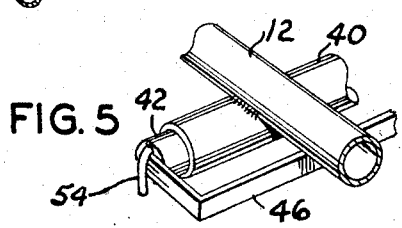
LAURANCE E. HELDENBRAND
INVENTOR.
BY
Robert K. Rhea
AGENT

United States Patent Office 3,434,732
Patented Mar. 25, 1969

3,434,732
VERTICALLY ADJUSTABLE CATTLE CHUTE
Laurance E. Heldenbrand, 1012–14 S. Agnew,
Oklahoma City, Okla. 73108
Filed Aug. 16, 1967, Ser. No. 660,981
Int. Cl. B62d 21/14
U.S. Cl. 280—43.17      3 Claims

ABSTRACT OF THE DISCLOSURE

Wheel equipped crank arm axles are pivotally supported for vertical movement about a horizontal axis extending transversely of a cattle chute frame. A tube extending transversely of the frame, forwardly of the transverse axles axis, telescopingly receives frame supporting stub shafts. Spring actuated levers, connected with the stub axles, normally urge the latter outwardly of the respective sides of the frame in releasable overlying frame supporting relation with respect to the crank arm axles. Winch means, connected with the crank arm axles, selectively raise and lower the wheels.

Background of the invention

The persent invention relates to a trailer-type cattle chute and more particularly to a means for raising and lowering the wheels thereof with respect to its frame for supporting the frame by the wheels and placing the frame on the surface of the earth.

In working range cattle or other animals it is necessary and desirable that a means be provided for holding or controlling the animal. This has been done by the provision of an upright open frame-work commonly referred to as a cattle chute and usually portable in a two-wheel trailer fashion.

When the cattle chute is positioned at a desired location for working animals, such as when being treated by a veterinarian, branding, dehorning, or the like, it is desirable that the frame of the chute be positioned on the surface of the earth for the convenience of the operators and in placing the animals therein as well as releasing the animals.

My prior Patent No. 2,466,102 provides a means for such raising and lowering a frame including means for tilting the frame with respect to the surface of the earth for loading cattle into trucks, or the like. While this patent has proved satisfactory in operation considerably more components are required than has been found necessary and convenient as shown by the details of the present invention as hereinafter described. Furthermore, this invention provides a means for more easily and quickly lowering the supporting wheels to chute supporting position and raising the wheels to lower the frame into contact with the surface of the earth.

Summary of the invention

The base portion of a cattle chute frame is provided with wheel-equipped crank arm-like axles which are pivotally interconnected transversely of the depending rearward end portion of the frame with the crank arm axles projecting toward the front of the frame when in transporting position. A tubular member is secured transversely of the frame, medially its length, and projects laterally toward the crank arm axles. Frame supporting stub shafts are telescopingly received by the respective end of the tubular member and are normally urged outwardly in releasable overlying relation with respect to the crank arm axles. Manually operated winch means, mounted on the frame and connected by a cable to a lift lever secured to one wheel axle, raises and lowers the wheels for positioning the frame on the earth's surface or in wheel supported position, respectively. When the winch is operated to lower the wheels, cam means, on the lift lever contacts the end of one stub shaft and automatically retracts the latter as the frame is raised, with respect to the wheels, while the spring means extends the stub shafts to wheel supporting position of the frame when the wheels are lowered a predetermined distance below the lower surface of the frame. The wheels are raised to lower the frame, by the winch means, by manually moving the stub shafts inwardly of the tube when the wheels are lowered slightly to release the crank arm wheel axles. When the frame is positioned on the surface of the earth the crank arm axles and wheels are pivoted rearwardly of the frame in an out-of-the-way position.

It is, therefore, the principal object of this invention to provide a means for easily lowering the wheels of a cattle chute for supporting the chute in a mobile manner and raising the wheels to position the frame on the surface of the earth.

Brief description of the drawings

FIGURE 1 is a fragmentary side elevational view of a cattle chute frame in trailer-type wheel supported position;

FIGURE 2 is a view similar to FIG. 1 illustrating the frame positioned on the surface of the earth with the wheels in raised position and illustrating, by dotted lines, the position of the wheels when pivoted rearwardly in an out-of-the-way position;

FIGURE 3 is a fragmentary perspective view of the wheels and axles illustrating the relative position of the frame with respect to its supporting means when lowering the wheels;

FIGURE 4 is a view similar to FIG. 3 illustrating the frame in wheel supported position;

FIGURE 5 is a fragmentary perspective view illustrating details of one wheel axle supporting telescoping stub shaft; and, FIGURE 6 is a fragmentary perspective view illustrating the position of the cam means.

Description of the preferred embodiment

Like characters of reference designate like parts in those figures of the drawings in which they occur.

In the drawings:

The reference numeral 10 indicates a cattle chute open type frame, as a whole, which is rectangular in general configuration having parallel main lower frame side members or base rails 12 and 14 transversely interconnected by braces 16, only two being shown. The frame further includes upstanding rearward end members 18, only one being shown, and forward upright end members 20 and 21 interconnected at their upper limit by top members 22. A tongue 24 and trailer hitch 26, connected with the braces 16, provide a means for transporting the frame in trailer fashion as hereinafter described.

The above description of the cattle chute frame is substantially conventional and is set forth to show the type of frame with which the present invention is intended to be used.

In carrying out the invention an axle 30 is extended transversely beyond the frame, rearwardly of its transverse central portion, and is journaled by sleeves 31 secured to the depending surface of the base rails 12 and 14, respectively. Crank arm-like right angular axles 33 and 34 are secured by one of their respective leg end portions 35 and 36 to the respective end of the axle 30. The length of the crank arm legs 35 and 36 is preferably at least equal to or greater than the radius of tire equipped wheels 37 mounted on wheel hubs 38 in turn journaled by the other shorter leg end portions 35' and 36' of the crank arm axles 33 and 34. The axle legs 35 and 36 are parallel with the respective base rails 12 and 14. A tube 40 is transversely secured to the depending surface of the base rails 12 and 14 medially their ends and in parallel spaced rleation forwardly of the axle 30 a distance slightly less than the length of the respective crank arm leg 35 and 36. The tube 40 projects beyond the respective base rails 12 and 14 and terminates in spaced relation with respect to the position of the crank arm axle legs 35 and 36 when positioned as shown in FIGS. 3 and 4. Cylindrical stub shafts 42 and 44 are telescopingly received by the respective ends of the tube 40. The respective free ends of the stub shafts 42 and 44 are connected with strap iron members 46 and 48 which extend rearwardly and forwardly, respectively parallel with respect to the respective side members 12 and 14, a relatively short distance and are turned inwardly substantially parallel with respect to the tube 40 terminating medially its length on opposing sides thereof. The inwardly disposed ends of the members 46 and 48 are interconnected across the tube 40 by a lever 50 pivotally connected to the tube 40 medially its ends. A spring 52 is connected at one end to one end of the lever 50 and connected, at its other end, to the tube 40 adjacent the base rail 12. A stop 53 on the tube 40 limits the pivoting movement of the lever 50 for limiting the outward movement of the stub shafts with respect to the tube 40. A pin projects outwardly and downwardly of the free end of the stub shaft 42 for the purposes presently explained.

A worm gear hand operated windlass or winch 56, having an operating handle 58, is mounted on the forward frame upright 20. A soft laid cable 60 is entrained around the drum of the winch 56, around an idling pulley 62 secured to the outer side surface of the base rail 12, adjacent its forward end, and removably connected at its other end portion, to a lift lever 64. The lift lever 64 is longitudinally connected by one end portion to the leg 35 of the crank arm axle 33 and extends forwardly and upward therefrom on an obtuse angle, as shown in FIG. 1.

A striker plate or cam 55 is connected to the lift lever 64 and projects downwardly and outwardly, as seen in FIG. 6, in inclined relation with respect to the longitudinal axis of the stub shaft 42 and with respect to the stub shaft pin 54 for the reasons more fully explained hereinbelow.

*Operation*

Assume that the cattle chute frame 10 is disposed on the surface of the earth, as shown in FIG. 2. The free end of the cable 60 is manually connected to the lift 64 and the handle 58 is operated to wind the cable 60 on the drum of the winch 56. This fulcrums the crank arm axles 33 and 34 about the horizontal longitudinal axis of the axle 30 by forcing a peripheral portion of the wheels 37 against the surface of the earth. As the rearward end portion of the frame is progressively raised, by this action, the cam 55 contacts the pin 54 and forces the stub shaft 42 inwardly of the tube 40 while simultaneously the stub shaft 44 is drawn into the tube 40 by the pivoting action of the lever 50. When the rearward end portion of the frame 10 has been raised or tilted by lowering the wheels 37 with respect to the base rails 12 and 14, a distance sufficient to permit the depending end of the pin 54 to lie in a plane above the crank arm axle leg 35, the spring 52 pivots the lever 50 and forces or pulls the stub shafts 42 and 44 outwardly of the tube 40 in overlying relation with respect to the crank arms 33 and 34. The winch handle 58 is then operated in the other direction to release the cable and permit the frame to be supported by contact of the respective crank arm axle legs 35 and 36 with the respective stub shafts 42 and 44. Thereafter the cattle chute may be transported by means of the trailer hitch and tongue 24 in two-wheel trailer fashion.

When it is desired to reposition the frame 10 on the surface of the earth the winch handle 58 is operated with the cable connected to the lift lever 64 to lower the wheels 37 with respect to the frame which tilts the rearward end of the frame upwardly so that the crank arm axle legs 35 and 36 are out of contact with the respective stub shafts 42 and 44. The stub shaft 42 is manually forced inwardly into the tube 40 which similarly telescopes the stub shaft 44 into the other end of the tube 40 by means of the lever 50. The winch handle 58 is then operated, in the other direction, to unwind the cable 60 so that the frame is progressively lowered toward the surface of the earth. When the frame has been positioned on the surface of the earth, as shown in FIG. 2, the crank arm axles 33 and 34, wheels 37 and lift lever 64 may be manually pivoted, about the longitudinal axis of the axle 30 by means of the lift lever 64, toward a rearward out-of-the-way position as shown by dotted lines in FIG. 2.

I claim:

1. In combination with a cattle chute having a main frame including substantially parallel spaced-apart base rails, the improvement comprising: wheel equipped axle means pivotally connected with said base rails, said axle means comprising an elongated axle projecting beyond opposing sides of said frame, a pair of right angular crank arm-like axles each having a longer leg portion and a shorter leg portion, the free end of each said longer leg portion being connected in right angular relation to the respective end portion of said elongated axle, wheel hubs journaled by said shorter leg portions; telescoping shaft means connected with said base rails and releasably holding said frame in wheel supported position, said shaft means comprising a tube extending transversely of said frame in spaced parallel relation with respect to said elongated axle, the respective ends of said tube terminating inwardly of the vertical plane defined by the longer leg portion of said crank arm axles, a stub shaft within and normally projecting outwardly of the respective end portion of said tube, spring means urging said stub shafts outwardly of said tube, said spring means comprising a lever connected with said tube intermediate its ends for horizontal pivoting movement, a strap-iron member extending between and connected with the respective end portion of said lever and the outwardly disposed end surface of the respective stub shaft, and a spring extending between and connected with one end of said lever and an end portion of said tube remote from said lever; and lift lever means pivoting said axle means in a raising and lowering action of said frame with respect to the earth's surface.

2. Structure as specified in claim 1 and a cam connected with said lift lever means and releasably engaging the end portion of one said stub shaft for moving said stub shafts inwardly of said tube when said crank arm axles are pivoted downwardly toward frame wheel supporting position.

3. Structure as specified in claim 2 in which said lift lever means comprises an elongated lever connected, at one end portion, to one said crank arm axle and normally projecting forwardly and upwardly from said elongated axle, and winch means connected with said frame, said winch means including a cable releasably connected with the free end portion of said lift lever for moving the latter and raising and lowering the wheels with respect to said frame in a fulcruming action against said frame about the longitudinal axis of said elongated axle.

References Cited

UNITED STATES PATENTS 2,416,102   4/1949   Heldenbrand _____ 280—30
2,996,307   8/1961   De Bailleux _____ 280—43.17

LEO FRIAGLIA, *Primary Examiner.*

R. R. SONG, *Assistant Examiner.*